United States Patent [19]

Cornell et al.

[11] Patent Number: 4,585,606

[45] Date of Patent: Apr. 29, 1986

[54] METHOD OF MAKING AN ENDLESS FORMS FEED TRACTOR BELT

[75] Inventors: Robert W. Cornell; James K. Howes, both of Matthews, N.C.; Walter B. Koteff, West Palm Beach; Donald K. Rex, Highland Beach, both of Fla.

[73] Assignee: International Business Machines Corporation, Armonk, N.Y.

[21] Appl. No.: 655,132

[22] Filed: Sep. 27, 1984

[51] Int. Cl.[4] ........................ B28B 1/48; B29D 19/08; B65H 20/20

[52] U.S. Cl. ...................................... 264/156; 29/460; 156/304.1; 226/74; 264/252; 264/263

[58] Field of Search .................... 226/74, 75; 474/204, 474/218, 253; 264/156, 252, 263; 156/304.1; 29/460

[56] References Cited

U.S. PATENT DOCUMENTS

| | | | |
|---|---|---|---|
| 3,688,959 | 9/1972 | Staneck et al. | 226/75 |
| 3,825,162 | 7/1974 | Hubbard | 226/74 |
| 4,079,633 | 3/1978 | Cheema et al. | 226/74 |
| 4,226,353 | 10/1980 | Blaskovic et al. | 226/74 |
| 4,453,660 | 6/1984 | Cornell et al. | 226/74 |

OTHER PUBLICATIONS

McCray, Forms Feed Tractor, Apr. 1978, pp. 4524–4525, IBM Technical Disclosure Bulletin, vol. 20, No. 11A.

*Primary Examiner*—Stanley N. Gilreath
*Attorney, Agent, or Firm*—M. W. Scheeter; Richard Bee; J. Jancin, Jr.

[57] ABSTRACT

A forms feed tractor belt includes drive members molded around a thin, flexible band at longitudinal intervals. To make the belt, slots are first punched at longitudinal intervals in at least one side of the flexible band. Drive members are then molded around the band at the slots except for at least one drive memberless interval at each end of the band. The ends of the band are overlapped so that the slots of the drive memberless intervals coincide. Final drive members are then molded around the slots of each pair of coincided drive memberless intervals to complete the endless tractor belt.

3 Claims, 12 Drawing Figures

METHOD OF MAKING AN ENDLESS FORMS FEED TRACTOR BELT

DESCRIPTION

1. Background of the Invention

This invention relates to a method of making an endless forms feed tractor belt. More particularly, the tractor belt is to be used for moving a record medium having edge perforations.

2. Description of the Related Art

Forms feed mechanisms have been used for many years for moving paper through printers and the like. The paper conventionally utilized has pre-punched perforations along both sides. Tractor mechanisms, including an endless tractor belt, are mounted at an appropriate place on the printer so that drive members mounted on the belt are inserted into the paper perforations. Rotation of the belt causes the drive members to move, carrying the paper forward in the printer. Belt rotation can be activated by any form of belt drive mechanisms.

Tractor belts generally consist of a band with drive members mounted thereon. The drive members may be mounted on the band by molding. It is known to mold the entire belt, drive members and band, from a single moldable material in a single molding operation. However, this method of molding fails to optimize the individual material characteristics of each belt part. The drive members should be made from a hard, wear resistant material whereas the band material should be flexible and durable.

Another method of mounting drive members on the band consists of molding the drive members through perforations in the band. This method of mounting has several drawbacks. First, perforations in the band tend to act as stress concentrators during belt use. Stress concentration can lead to the formation of defects such as cracks which can cause premature failure. Another drawback is that drive members may be poorly fit to the perforations in the band. Subsequent movement of the drive members with respect to the band may also cause wear and premature failure. Still another drawback is that the perforations in the band must be close enough to the lateral center of the band to allow for a sufficient thickness of band material on all sides of the perforations. This limits the possible use of drive members mounted off-center laterally with respect to the band.

Past tractor belt designs have still other associated problems. Little protection is typically provided to prevent the paper from contacting the band. Excessive contact between the paper and the thin band can result in premature wear of the band. In addition, some drive member designs maintain a small gap between the base of the pin and the band. A paper edge can wedge into this gap and cause poor paper feeding.

It is therefore desirable to create a tractor belt in which the causes of band wear are minimized. This may be accomplished by the use of a proper belt design and method of belt making.

SUMMARY OF THE INVENTION

It is the principal object of this invention to provide an improved method of making an endless forms feed tractor belt.

This and other objects are accomplished by providing a method of making an endless forms feed tractor belt including drive members molded around a thin, flexible band at longitudinal intervals. The drive members consist of an upper pin portion, a shoulder portion, and a lower drive element portion. The pin portions are sized to engage perforations in the paper. The shoulder portions are integral to and inseparable from both the pin portions and the drive element portions of the drive members in order to prevent paper from wedging in gaps or contacting the band. The drive element portions are shaped to engage a sprocket.

The belt is produced by first punching slots in at least one side of a thin, flexible band at longitudinal intervals. Drive members are then molded around the band at each of the slots except for at least one drive memberless interval at each end of the band. The ends of the band are overlapped so that the slots of the drive memberless intervals at each end of the band coincide. Final drive members are then molded around the slots of each pair of coincided memberless intervals to complete the endless tractor belt.

DESCRIPTION OF THE PREFERRED EMBODIMENT

Figure 1:
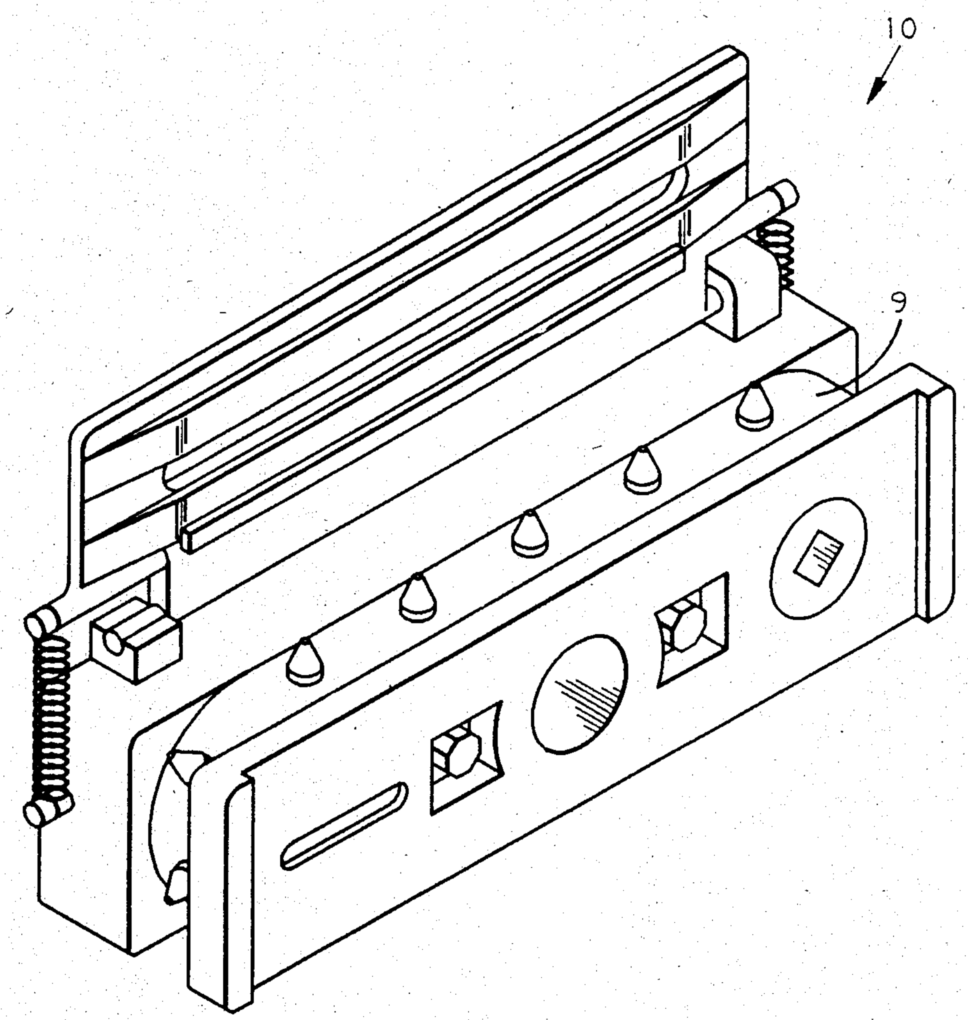
FIG. 1 is an isometric view of a tractor belt in a forms feed tractor mechanism.
Figure 2:
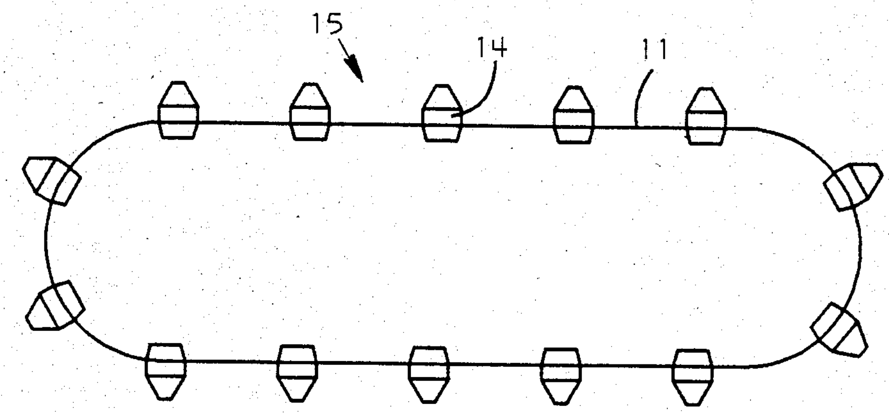
FIG. 2 is a side view of the tractor belt.
Figure 3:
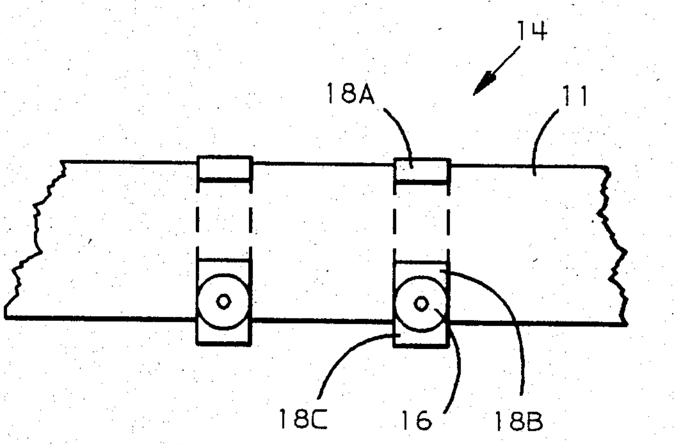
FIG. 3 is a top view of the tractor belt according to the preferred embodiment of the invention.
Figure 4:
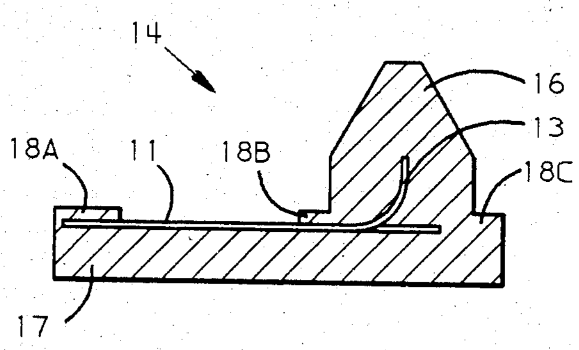
FIG. 4 is a cross-sectional view of a drive member as mounted on the flexible band.

FIG. 1 shows a conventional tractor belt 9 as used in a forms feed tractor mechanism 10. The forms feed tractor belt of the present invention is illustrated in FIG. 2. The tractor belt 15 includes drive members 14 mounted on a thin flexible band 11. Referring to FIGS. 3 and 4, drive members 14 include three portions. The upper pin portion 16 is sized to engage the perforations in a record medium which is usually, although not limited to, paper. The lower drive element portion 17 is shaped to engage a sprocket. Activation of the sprocket causes the belt to rotate, thereby advancing the paper. The drive members also have shoulder portions 18*a*, 18*b* and 18*c* which are sufficiently raised above the band to prevent the paper from contacting the band.

In the preferred embodiment, drive members 14 are single molded units. Therefore, the shoulder portions 18*a*, 18*b* and 18*c* are integral to and inseparable from corresponding pin portions 16 and drive element portions 17 of the drive members. There are no gaps between the base of the pin portion and the band into which the edge of the paper can wedge.

FIGS. 3 and 4 also illustrate that drive members 14 are molded around, though not necessarily surrounding, band 11. There are no perforations in the band which can cause premature failure. Furthermore, the pin portions can be mounted off-center laterally with respect to the band, if desired.

Referring to FIGS. 5–8, slots 12*a*, 12*b* and 12*c* are at longitudinal intervals 21 along first and second sides of band 11. Each of these slots serves to anchor the drive members fixed to the band in all directions. Tabless slot 12*c* is also important in the method of making the tractor belt, as disclosed later in the specification in the discussion of the molding of the final drive members. Tabs 13 exist within slots 12*b*. Tabs 13 are deflected into drive members 14, as shown in FIG. 4. The tabs are also used in fixing the position of the drive members on the band. The size and shape of slots 12*a*, 12*b*, and 12*c* and tabs 13 are not limited to those shown in the drawing, but those skilled in the art will realize that they may be any shape capable of fixing the drive member position upon the band.

The method of making tractor belt 15 of FIG. 2 begins by providing flexible band 11. The band is preferably made from a material characterized by high flexibility, low moisture absorption, no creep, and high tensile strength. Additionally, the band should be made from a material capable of withstanding the processing temperatures required to manufacture the belt. Examples of suitable materials are plastic films of polyimide or polyester.

Figure 5:
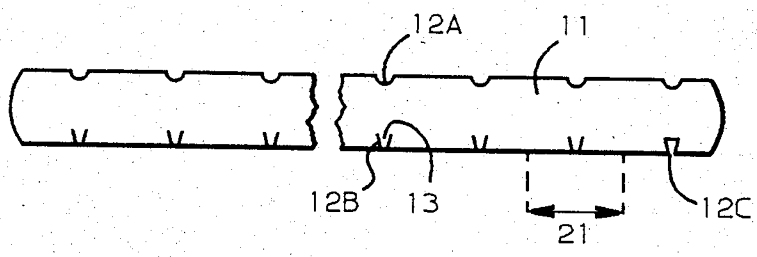
FIGS. 5 is a top view of the flexible band.
Figure 6:
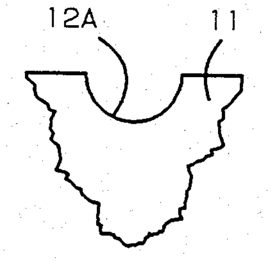
FIGS. 6, 7 and 8 are magnified top views of the slots in the flexible band shown in FIG. 5.
Figure 7:
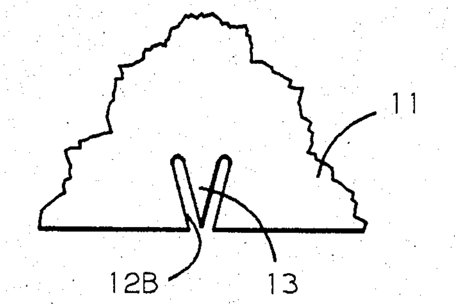
Figure 8:
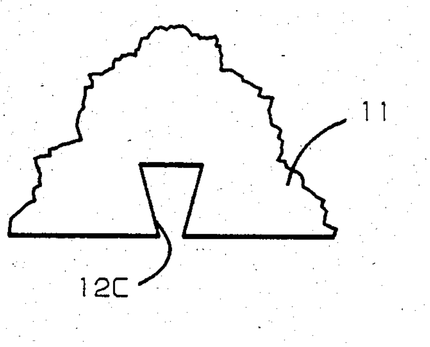
Figure 9:
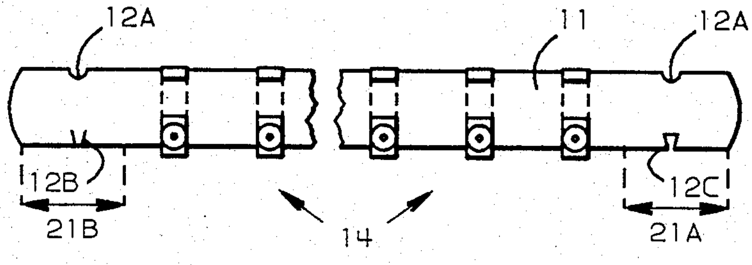
FIG. 9 is a top view of the flexible band with drive members mounted thereon prior to overlapping the band ends.
Figure 10:
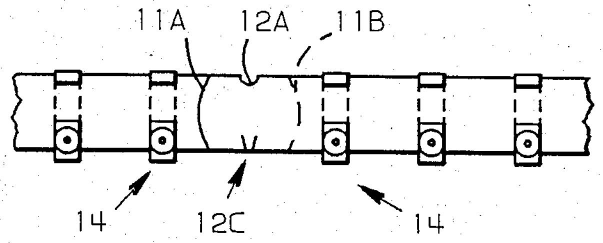
FIG. 10 is a top view of the flexible band with the band ends overlapped but prior to mounting of the final drive members.
Figure 11:
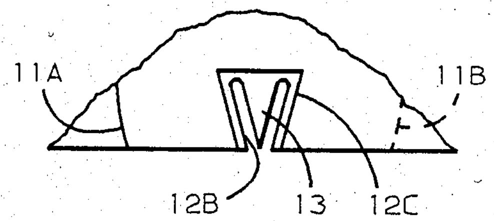
FIG. 11 is a magnified view of FIG. 10.
Figure 12:
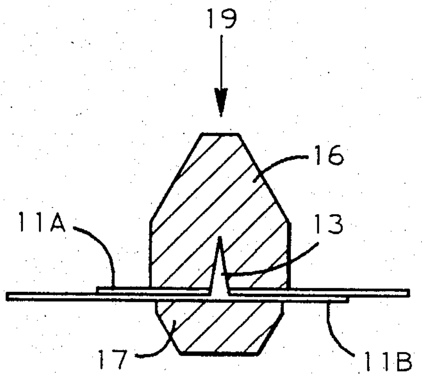
FIG. 12 is a cross-sectional view of a drive member as mounted on the overlapping ends of the flexible band.

Slots 12*a*, 12*b*, and 12*c* are punched into the band at longitudinal intervals 21, leaving tabs 13 remaining in slots 12*b* as previously shown in FIG. 5. Referring to FIG. 9, drive members 14 are molded around band 11 at each of the slots except for drive memberless intervals 21*a* and 21*b* containing slots 12*a*, 12*b*, and 12*c* at opposite ends of the band. The drive members may be molded simultaneously, or one at a time. The drive members are preferably made from a moldable, wear-resistant material such as glass-filled nylon. Referring to FIG. 10, the ends of the band 11*a* and 11*b* are then overlapped so that the drive memberless intervals 21*a* and 21*b*, and slots therein 12*a*, 12*b* and 12*c*, coincide. FIG. 11 shows overlapped slots 12*c* and 12*b*. A final drive member is then molded around slots 12*a*, 12*b*, and 12*c* of coincided drive memberless intervals 21*a* and 21*b* to form an endless tractor belt. FIG. 12 illustrates a cross-sectional view of final drive member 19 molded around overlapped ends 11*a* and 11*b* of the band. Alternatively, several final drive members may be molded around the overlapped ends of the band to add belt strength. To accommodate additional final drive members, several tabless slots are initially punched at one end of the band at successive longitudinal intervals. The intervals containing these slots, and corresponding intervals at the opposite end of the band, remain memberless until the band ends are coincided and final drive members are molded. Tabs 13 are deflected into the drive members either before or during molding, and remain within the drive members after molding. Injection molding is used in the preferred embodiment, but other types of molding may be used.

While the invention has been particularly shown and described with reference to a preferred embodiment thereof, it will be understood by those skilled in the art that various changes in detail may be made therein without departing from the spirit, scope and teaching of the invention. For example, other drive element portion shapes may be used, provided they are compatible with the remainder of the mechanism. Accordingly, the apparatus and method herein disclosed is to be limited only as specified in the following claims.

What is claimed is:

1. A method of manufacturing an endless forms feed tractor belt comprising the steps of:

providing a thin, flexible band having a first side and a second side;

punching slots in at least one side of said band at longitudinal intervals so that a tab remains within each of said slots on at least one of said sides of said band except for at least one tabless slot at one end of said band;

molding drive members around said band at each of said slots except for said slots in an equal number of drive memberless intervals at each end of said band, said number of drive memberless intervals being equivalent to the quantity of said tabless slots at one end of said band, said tabs of said slots with said drive members having said tabs deflected into said drive members during molding and remaining deflected thereafter;

overlapping the ends of said band so that said drive memberless intervals at each end of said band coincide in pairs;

molding final drive members around said band at said slots of each pair of said coincided drive memberless intervals, said tabs of said slots of said coincided drive memberless intervals deflected into said drive members during molding and remaining deflected thereafter.

2. The method according to claim 1 wherein said tabs are deflected prior to molding said drive members, said tabs remaining within said drive members after molding.

3. The method according to claim 1 or 2 wherein said molding is injection molding.

* * * * *